US012355183B2

(12) United States Patent
Heien et al.

(10) Patent No.: US 12,355,183 B2
(45) Date of Patent: Jul. 8, 2025

(54) CABLE PROTECTION STRUCTURES

(71) Applicant: Rivian IP Holdings, LLC, Irvine, CA (US)

(72) Inventors: Stephen Gregory Heien, Lake Orion, MI (US); Dennis Bradley-Cage, Canton, MI (US); George A. Corder, Romulus, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 526 days.

(21) Appl. No.: 17/707,228

(22) Filed: Mar. 29, 2022

(65) Prior Publication Data

US 2023/0061067 A1 Mar. 2, 2023

Related U.S. Application Data

(60) Provisional application No. 63/238,891, filed on Aug. 31, 2021.

(51) Int. Cl.

| | |
|---|---|
| ***H01R 13/58*** | (2006.01) |
| ***H01R 4/28*** | (2006.01) |
| ***H01R 13/502*** | (2006.01) |
| ***H01R 13/514*** | (2006.01) |

(52) U.S. Cl.
CPC ............... *H01R 13/58* (2013.01); *H01R 4/28* (2013.01); *H01R 13/502* (2013.01); *H01R 13/514* (2013.01); *H01R 2201/26* (2013.01)

(58) Field of Classification Search
CPC ........ H01R 13/58; H01R 4/28; H01R 13/502; H01R 13/514; H01R 2201/26; H01R 13/5804
See application file for complete search history.

(56) References Cited

U.S. PATENT DOCUMENTS

| | | | | |
|---|---|---|---|---|
| 4,614,398 A * | 9/1986 | Wright | H01R 13/6592 439/585 |
| 4,944,685 A * | 7/1990 | Schulte | H01R 13/60 439/142 |
| 10,490,932 B1 * | 11/2019 | Schneider | H01R 13/521 |
| 2014/0216811 A1 * | 8/2014 | Turner | H02G 15/007 174/659 |
| 2019/0044277 A1 * | 2/2019 | Mellott | H01R 13/113 |
| 2020/0262364 A1 * | 8/2020 | Eshima | H02G 3/0406 |
| 2022/0416463 A1 * | 12/2022 | Kondo | H01R 13/405 |

FOREIGN PATENT DOCUMENTS

| | | | |
|---|---|---|---|
| EP | 3093929 A1 * | 11/2016 | H01R 13/5804 |
| EP | 3570386 A1 * | 11/2019 | H01R 13/5208 |

* cited by examiner

*Primary Examiner* — Travis S Chambers
(74) *Attorney, Agent, or Firm* — Haley Guiliano LLP

(57) ABSTRACT

An impact-resistant cable connector includes a connector body, and a resilient block having a first surface facing the connector body and separated from the connector body by a first distance, a second surface opposite the first surface, and one or more bores, each of the one or more bores running through both the first surface and the second surface. One or more wires are coupled to the connector body, each respective one of the wires passing through a respective one of the bores. The resilient block is configured to limit bending of the one or more wires about a first axis parallel to the first surface. Such configuration may include spacing the resilient block away from the first surface by a first distance that is less than half the height of the resilient block.

20 Claims, 4 Drawing Sheets

CABLE PROTECTION STRUCTURES

CROSS REFERENCE TO RELATED APPLICATION

This disclosure claims the benefit of commonly-assigned U.S. Provisional Patent Application No. 63/238,891, filed Aug. 31, 2021, which is hereby incorporated by reference herein in its entirety.

INTRODUCTION

This disclosure relates to structures for protecting cables. More particularly, this disclosure relates to protecting cables from impact damage—e.g., from a vehicle collision.

Electrical wiring harnesses in applications that are subject to physical impact may be damaged where conductors meet a connector, either from direct external impact or as a result of conductors being forced against the body of the connector. While strain relief systems provide some protection against bending of conductors against the connector, strain relief systems are not designed to protect against high-impact forces, such as those that may be experienced in a vehicle collision if the wiring harness is found in a vehicle. This may be of particular concern for high-voltage wiring such as the traction systems of electric vehicles, but also for other higher-voltage systems (e.g., air conditioning) in any vehicle.

SUMMARY

In accordance with implementations of the subject matter of this disclosure, an impact-resistant cable connector includes a connector body, a resilient block having a first surface facing the connector body and separated from the connector body by a first distance, and a second surface opposite the first surface. The resilient block has one or more bores running through both the first surface and the second surface. One or more wires are coupled to the connector body, each respective one of the wires passing through a respective one of the bores. The resilient block is configured to limit bending of the one or more wires about a first axis parallel to the first surface.

In a first implementation of such an impact-resistant cable connector, the resilient block has a first hardness, and the connector body has a second hardness higher than the first hardness.

According to a first aspect of that first implementation, the first hardness may have a Durometer Shore A value between 55 and 70. In an instance of that first aspect, the first hardness may have a Durometer Shore A value of 60.

A second implementation of such an impact-resistant cable connector may have two or more bores, and the bores in the resilient block may be space6363d apart by a distance sufficient to prevent at least one of arcing and short-circuiting between the wires when insulation on the wires is damaged.

In a third implementation of such an impact-resistant cable connector, the resilient block may have a degree of electrical insulation sufficient to prevent at least one of arcing and short-circuiting between the wires when insulation on the wires is damaged. According to one aspect of that third implementation, the resilient block may have a comparative tracking index between 175 and 600. In one instance of that aspect, the resilient block may have a comparative tracking index between 400 and 600.

In a fourth implementation of such an impact-resistant cable connector, each respective one of the bores has an inner diameter that is sized to provide an interference fit with an outer diameter of each respective one of the wires.

A fifth implementation of such an impact-resistant cable connector may further include an abrasion-resistant sleeve surrounding the resilient block and the wires, and a fastener that frictionally clamps the abrasion-resistant sleeve to the resilient block.

In a sixth implementation of such an impact-resistant cable connector, the resilient block may have a block height measured in a first direction along the first surface perpendicular to the first axis, and the first distance may be less than half the block height.

According to one aspect of the sixth implementation, the connector body may have a connector body height measured in the first direction, and the first distance may be less than half the connector body height.

A resilient block in accordance with implementations of the subject matter of this disclosure, for use in an impact-resistant cable assembly, has one or more bores extending therethrough from a first surfact to a second surface opposite the first surface, for the passage of one or more wires. The resilient block is configured to limit bending of the one or more wires about a first axis parallel to the first surface, within a first distance from the first surface. The resilient block has a hardness with a Durometer Shore A value between 55 and 70.

In a first implementation of such a resilient block, the hardness of the block may have a Durometer Shore A value of 60.

A second implementation of such a resilient block may have two or more bores for the passage of two or more respective wires. The bores may be spaced apart by a distance sufficient to prevent at least one of arcing and short-circuiting between the wires when insulation on the wires is damaged.

A third implementation of such a resilient block may have a comparative tracking index between 175 and 600. According to one aspect of that third implementation, the comparative tracking index may be between 400 and 600.

An impact-resistant cable assembly according to implementations of the subject matter of this disclosure includes one or more wires, a resilient block having a number of bores extending therethrough from a first surface to a second surface opposite the first surface, the number of bores corresponding to the number of wires. Each respective one of the wires passes through a respective one of the bores. The resilient block is configured to limit bending of the one or more wires about an axis parallel to the first surface, within a first distance from the first surface. An abrasion-resistant sleeve surrounds the resilient block and the one or more wires, and a fastener frictionally clamps the abrasion-resistant sleeve to the resilient block.

In a first implementation of such an impact-resistant cable assembly, the resilient block may have a hardness with a Durometer Shore A value between 55 and 70. According to one aspect of that first implementation, the hardness may have a Durometer Shore A value of 60.

In a second implementation of such an impact-resistant cable assembly, the resilient block may have a comparative tracking index between 175 and 600.

According to one aspect of that second implementation of such an impact-resistant cable assembly, the resilient block may have a comparative tracking index between 400 and 600.

In a third implementation of such an impact-resistant cable assembly, the resilient block has a block height measured in a first direction along the first surface perpendicular to the first axis, the first distance being less than half the block height.

BRIEF DESCRIPTION OF THE DRAWINGS

Further features of the subject matter of this disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
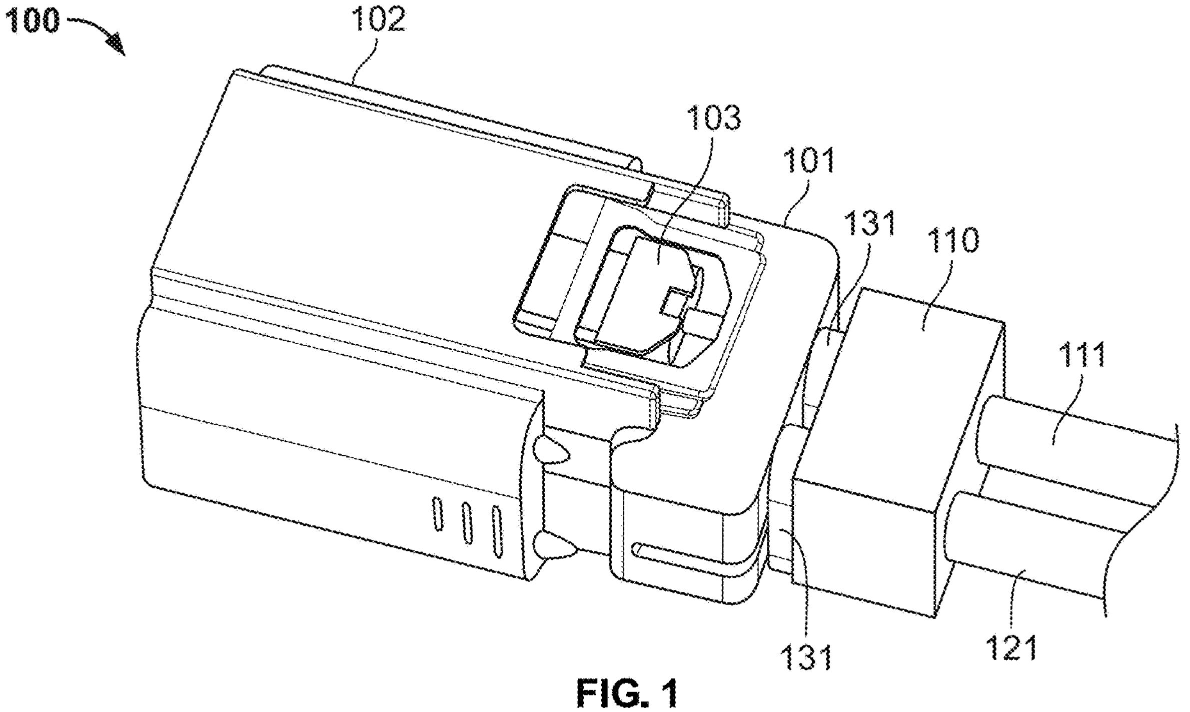
FIG. 1 shows a connector assembly in accordance with implementations of the subject matter of this disclosure.
Figure 2:
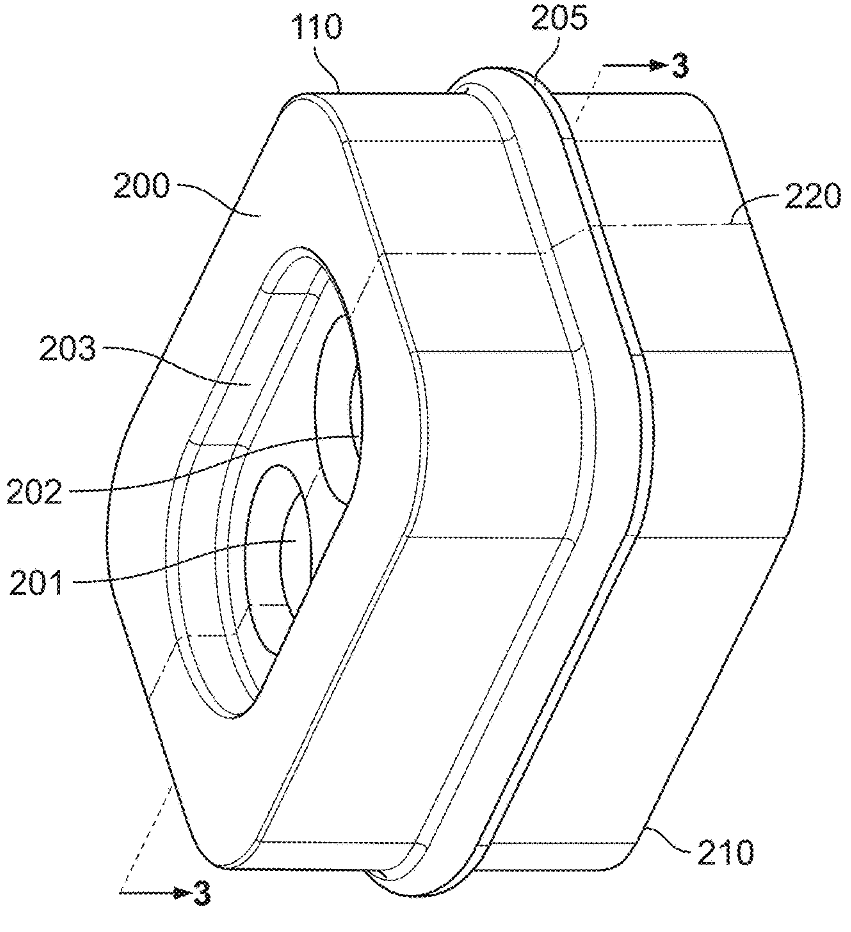
FIG. 2 is an isometric view of a resilient block used in implementations of the subject matter of this disclosure.
Figure 3:
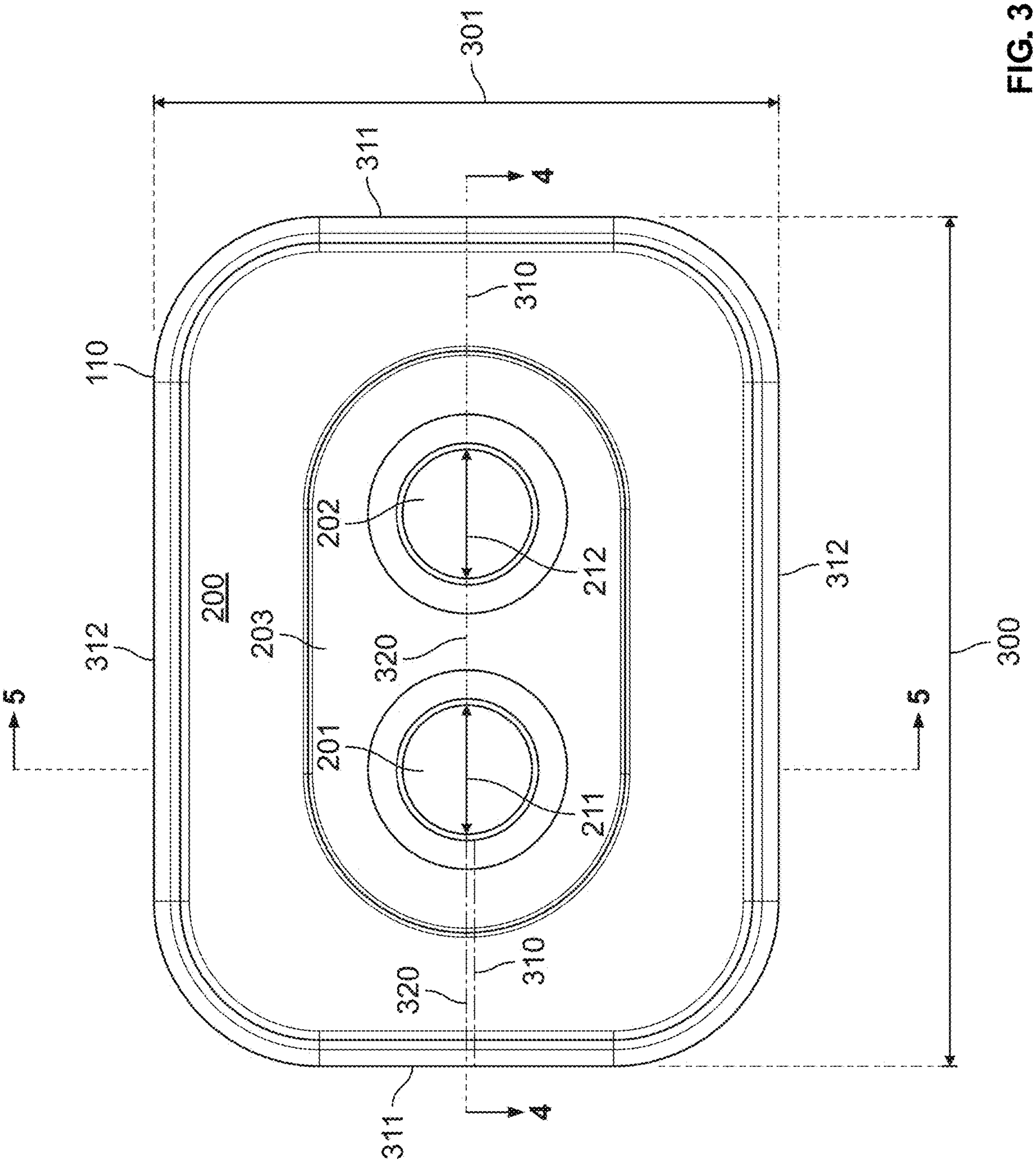
FIG. 3 is an elevational view, taken from line 3-3 of FIG. 2, of the resilient block of FIG. 2.
Figure 4:
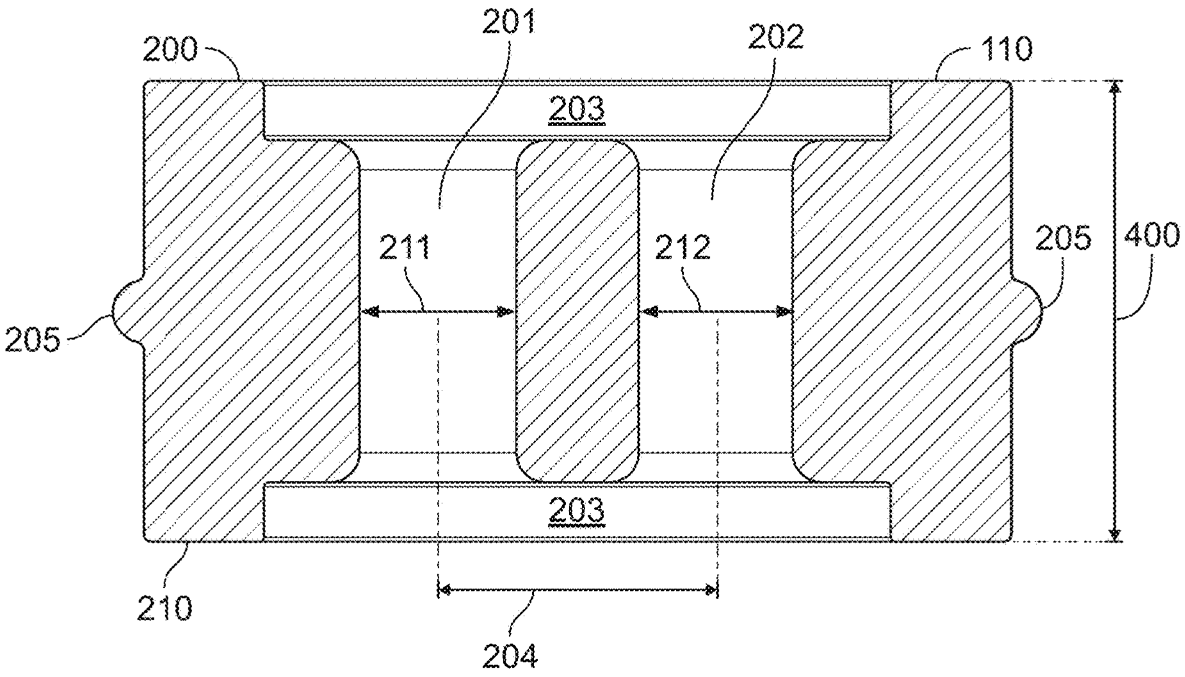
FIG. 4 is a cross-sectional view, taken from line 4-4 of FIG. 3, of the resilient block of FIGS. 2 and 3.
Figure 5:
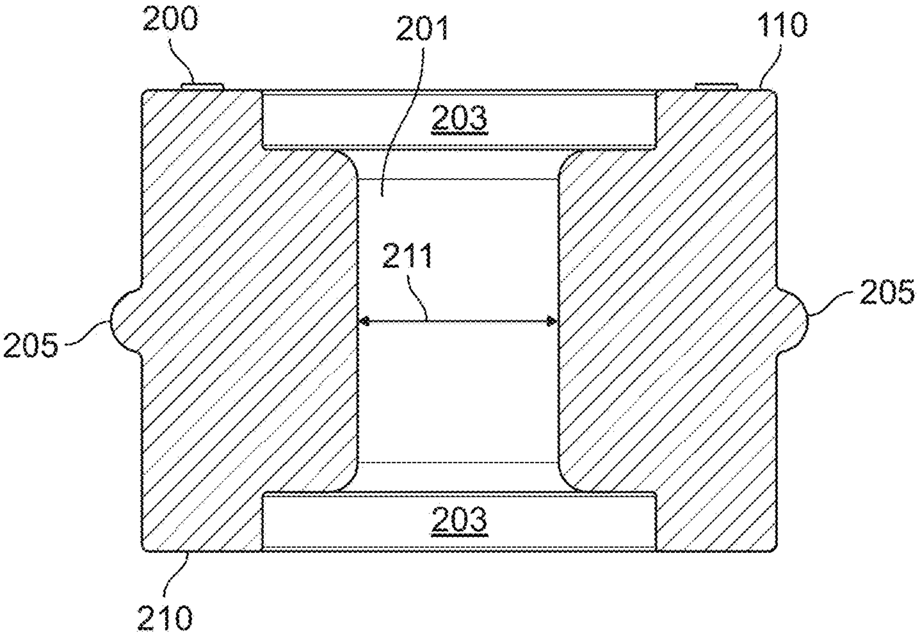
FIG. 5 is a cross-sectional view, taken from line 5-5 of FIG. 3, of the resilient block of FIGS. 2-4.

As noted above, strain relief systems provide some protection against bending of conductors against a connector to which they are coupled, but strain relief systems are not designed to protect against high-impact forces, such as those that may be experienced in a vehicle collision if the wiring harness is found in a vehicle. This may be of particular concern for high-voltage wiring such as the traction systems of electric vehicles, but also for other high-voltage systems (e.g., air conditioning) in any vehicle.

In accordance with implementations of the subject matter of this disclosure, wires are protected, where they are coupled to a connector, by a resilient block mounted around the wires adjacent to the connector body. Separate bores formed in the resilient block for each wire maintain spacing between the wires to prevent arcing or short-circuits even in the event of an insulation failure. But the presence of the resilient block reduces the likelihood of a failure by—in the event of an outside force, such as a collision or even just rerouting of the wires during maintenance—preventing excessive bending of wires immediately adjacent the hard connector body. Damage to the wire insulation by the hard connector body is thereby avoided. Moreover, the resilient block resists the effects of a direct impact on the wires that may occur, for example, in a collision.

The resilient block may be formed from a material that is not so hard that it itself becomes a potential source of damage to the wires from bending against it, but that is hard enough to resist significant impacts. In some implementations, the material of the resilient block may be softer the material of the connector, but harder than the wire (including the wire insulation). For example, a rubber or similar resilient polymeric material with a Durometer Shore A hardness between 55 and 70 may be used. In one implementation, a rubber material with a Durometer Shore A hardness of 60 may be used.

The material of the resilient block also should have electrical breakdown properties—i.e., should be sufficiently electrically insulating—to prevent arcing or short-circuiting at the separation distance maintained between the wires by the bores formed in the resilient block. In some implementations of the subject matter of this disclosure, the material may have a comparative tracking index, or CTI (which is a measure of electrical insulation performance), in CTI Group II ($400 \leq CTI < 600$) or at least CTI Group IIIa ($175 \leq CTI < 400$).

The wires may be inserted through the bores in the resilient block during assembly of the connector. Alternatively, the resilient block may be formed in two halves that can be placed around the wires, or as a single block that is slit to allow the wires to be slipped into the bores. In a slit implementation, there may be separate slit for each bore, or there may a slit from one surface of the resilient block into one bore, with that slit continuing on across the portion of the block between bores into the second bore.

In a slit implementation, or an implementation formed in two halves, one or more clips or ties may be used to hold the portions of the resilient block together. Such clips or ties may also increase the normal force of the material of the resilient block against the surface of the insulation of the wires in the bores, increasing the frictional force between the resilient block and the wires, to prevent the resilient block from sliding along the wires away from the body of the connector which otherwise could diminish the protection offered by the resilient block.

The resilient block protects the wires in part by absorbing impacts by compression of the material of the body of the resilient block. The resilient block also protects the wires by preventing the wires from being bent to sharply against the hard connector body. Instead, the body of the resilient block acts as a stop.

However, if the resilient block is spaced away from the connector body by more than a certain distance, the portions of the wires between the resilient block and the connector body would be able to bend enough to be damaged. Therefore, the resilient block should abut the connector body to minimize any such bending, and in implementations of the subject matter of this disclosure should be no further than a certain maximum distance that is determined by the geometry of the particular connector. In some implementations, where the bores in the connector body extend from a first surface of the connector body to a second surface opposite the first surface, and bending is to be prevented about a first axis parallel to the first surface, the resilient block has a block height, when measured along the first (or second) surface in a direction perpendicular to the first axis, that is more than twice the first distance.

In addition, if the resilient block is too far from the connector body, the wires when bent will contact the connector body before the resilient block does, so that the resilient block can no longer act as a stop. For that reason, sliding of the resilient block along the wires should be minimized or prevented.

Sliding of the resilient block along the wires away from the body of the connector may be prevented using clips or ties as described above. Sliding may further be prevented by choosing the outer diameter of the insulated wires and the inner diameter of each wire bore in the resilient block so that there is an interference fit, or at least a tight fit, of each wire in its respective bore. Selection of the materials of the resilient block and the wire insulation to provide a high coefficient of friction also contributes to prevention of sliding of the resilient block along the wires away from the body of the connector.

As a further measure of protection for the wires, a heavy sleeve may be disposed around the resilient block and may extend over the wires for all, or a substantial portion, of their length. The sleeve may be made from a material—e.g., woven or braided sleeves made of nylon, aramid or polyester strands—that is resistant to abrasion or cutting or to other damage that may occur in, e.g., a collision. The same tie or clip that holds the resilient block in place over the wires may be used to hold the sleeve in place. That is, the sleeve may be slid over the wires and over the resilient block, and then a tie or clip (or clips) may be used not only to keep the resilient block in place over the wires, but to keep the sleeve in place over the resilient block (and over the wires).

Although the implementations of the resilient block of this disclosure described below include two bores, for use with connectors having two wires, resilient blocks according to implementations of the subject matter of this disclosure may include any number of bores, for use with connectors having a corresponding number of wires.

The subject matter of this disclosure may be better understood by reference to FIGS. 1-6.

FIG. 1 shows a connector 100 to which a resilient block 110 has been added in accordance with implementations of the subject matter of this disclosure. Connector 100 includes a connector body or portion 101 coupled to wires 111, 121, and a portion 102 configured for coupling to an electrical system (not shown). Portions 101 and 102 may be releasably clipped together by clip 103. As described above, the use of resilient block 110 with connector 100 may be most advantageous when the electrical system is a high-voltage system such as a vehicle traction system or air conditioning system, but implementations of the subject matter of this disclosure may be used with any electrical system at any voltage.

Resilient block 110 is positioned relative to portion 101 of connector 100 to prevent wires 111, 121 from being damaged by the body of connector 100 in the event of a strong impact, such as a vehicle collision, that may bend wires 111, 121 strongly against portion 101 of connector 100 (notwithstanding the presence of strain relief boots 131 that are molded into portion 101 where portion 101 meets wires 111, 121), or that may drive pieces of connector 100 toward wires 111, 121 in the event connector 100 itself is damaged. If resilient block 110 is positioned too far from connector portion 101, the portions of wires 111, 121 between resilient block 110 and connector portion 101 may bend sufficiently to be damaged. Therefore displacement or sliding of resilient block 110 along wires 111, 121 may be prevented as described below.

As seen in FIGS. 2-5, resilient block 110 has two bores 201, 202 for accommodating wires 111, 121. The face 200 of resilient block 110 that faces portion 101 of connector 100 may include an optional recess 203 to accommodate strain relief boots 131 of portion 101 where portion 101 meets wires 111, 121. Optional recess 203 also may be provided in the face 210 of resilient block 110 that is opposite face 200, so that resilient block 110 can be more easily oriented for assembly onto wires 111, 121 by allowing either face 200 or face 210 to be oriented toward portion 101.

The separation distance 204 between bore 201 and bore 202 may be chosen based on the voltage difference expected between wires 111, 121 during operation, taking account of whatever insulation is provided on wires 111, 121, to prevent arcing or short-circuiting between wires 111, 121, particularly if the insulation is damaged. Separation distance 204 also may be chosen to maintain mechanical separation between wires 111, 121 contributing to the prevention of damage to wires 111, 121 in the event of an impact such as a collision.

The inner diameters 211, 212 of bores 201, 202 may be chosen for a tight or interference fit with the outer diameter of the outer insulation layer of each respective one of wires 111, 121. The materials of resilient block 110 and the wire insulation may be chosen to provide a coefficient of friction between resilient block 110 and wires 111, 121 that is sufficient to prevent resilient block 110 from sliding along wires 111, 121 under the effect of forces experienced during an impact or collision.

As noted above, the material of resilient block 110 also may be chosen so that resilient block 110 is not so hard that it itself becomes a potential source of damage to the wires from bending against it, but that is hard enough to resist significant impacts. In some implementations, the material of resilient block 110 may be softer the material of the connector body or portion 101, but harder than wires 111, 121 (including any wire insulation). For example, a rubber or similar polymeric material with a Durometer Shore A hardness between 55 and 70 may be used. In one implementation, a rubber material with a Durometer Shore A hardness of 60 may be used. As one example, EPDM (Ethylene Propylene Diene Monomer) rubber, or a similar material, may be used for resilient block 110 to provide both the desired hardness and a suitable coefficient of friction relative to the outer insulation layers of wires 111, 121.

As mentioned above, resilient block 110 can be slid onto wires 111, 121 during assembly of connector 100. That is, either before wires 111, 121 are terminated to connector portion 101, or before the other ends of wires 111, 121 are connected to any component, wires 111, 121 may be inserted into bores 201, 202. In a first alternative, resilient block 110 may be provided in two halves, separated along a plane 220 that includes the longitudinal axes of both bores 201, 202. In a second alternative, slits may be provided to allow wires 111, 121 to be slipped into bores 201, 202 without separating resilient block 110 into two pieces.

In one variant of such an alternative, a respective slit 310 (indicated by dot-dash lines) can be provided between each of bores 201, 202 and the surface of resilient block 110. In that variant, each of wires 111, 121 is inserted into its respective one of bores 201, 202 via a respective one of slits 310. Although slits 310 are shown as extending from respective bore 201, 202 to opposite short surfaces 311 of resilient block 110, each one of slits 310 also could extend to one of long surfaces 312, and in the latter case, the two slits 310 could extend to the same one of surfaces 312 or to opposite ones of surfaces 312.

In a second variant, a slit 320 (indicated by dot-dash lines) could extend from one of short surfaces 311 to a nearest one of bores 201, 202, and then extend through the center of resilient block 110 to the farther one of bores 201, 202. In such a variant, one of wires 111, 121 would be inserted through slit 320, past the nearest one of bores 201, 202 and into the farther one of bores 201, 202, and then the other one of wires 111, 121 would be inserted through slit 320 into the nearest one of bores 201, 202.

When resilient block 110 is slit—either into two halves or to provide slits for insertion of wires 111, 121 into bores 201, 202, a suitable fastener is provided to hold the halves together, or to hold the slits closed, and to maintain a sufficient normal force between the inner walls of bores 201, 202 and the insulated surfaces of wires 111, 121 to create sufficient friction to prevent sliding of resilient block 110 along wires 111, 121. The fastener may include one or more clips (not shown), or a tie such as a non-releasable cable tie 602 of the type commonly referred to as a "zip tie," as shown in the implementation 600 shown in FIG. 6.

Figure 6:
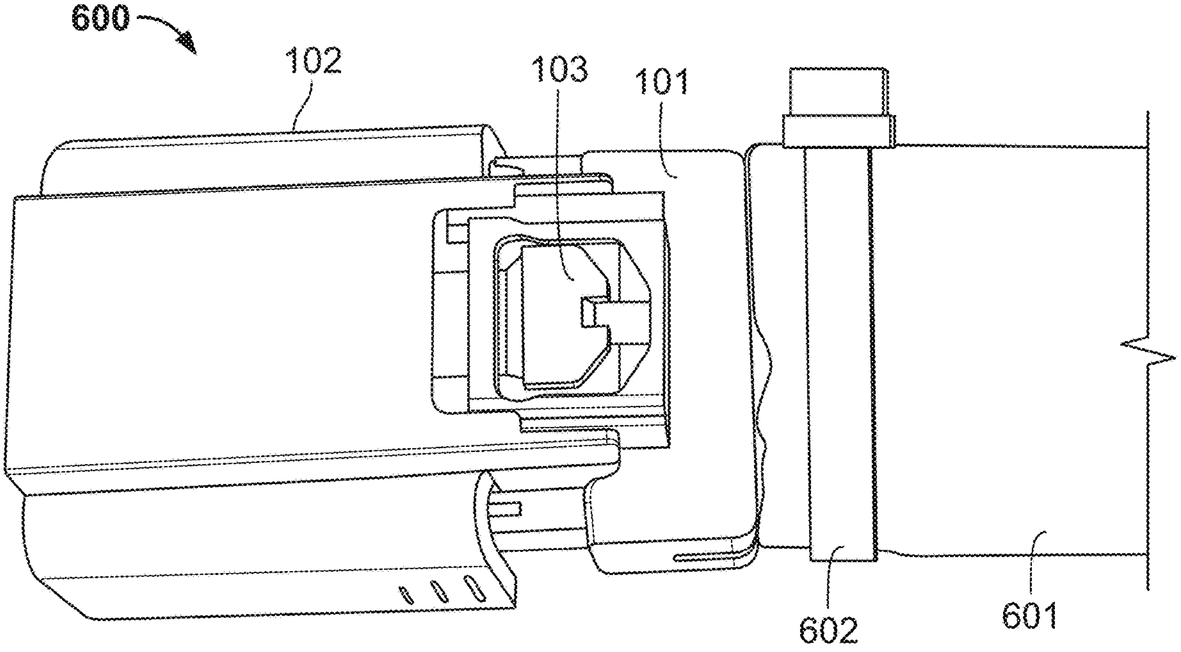
FIG. 6 shows a connector assembly in accordance with another implementation of this disclosure incorporating an abrasion-resistant sleeve.

In implementation 600 shown in FIG. 6, an abrasion-resistant sleeve 601 is fastened over resilient block 110 and wires 111, 121 to provide further protection from impact, and from abrasion or cutting by debris that may result from an impact or collision. Abrasion-resistant sleeve 501 may be made from woven or braided sleeves made of nylon, aramid or polyester strands, as described above. Abrasion-resistant sleeve 601 may be fastened onto resilient block 110 by the aforementioned fastener or fasteners that hold together the halves of resilient block 110 (in an implementation where there are such halves) or that hold closed slits 310 or 320. In implementation 600, the fastener is a single cable tie 602. As noted above, the same fastener or fasteners may be used whether or not abrasion-resistant sleeve 601 is present.

The dimensions of resilient block 110 are implementation-specific, and depend in part on the dimensions of connector 100. In general, the length and width of resilient block 110 will be comparable to the corresponding dimensions of connector 100 against which resilient block 110 rests. As for the height or depth of resilient block 110, the height or depth generally will not be so small as to collapse and allow wires 111, 121 to be pushed towards one another by an impact, but also will not be so large as to allow resilient block 110—and wires 111, 121 with it, which may potentially cause wire damage—to be bent out of the plane, perpendicular to the length and width of resilient block 110, that includes the longitudinal axes of bores 201, 202. In addition, to prevent excessive bending of wires 111, 121 between resilient block 110 and connector body 101, the distance between resilient block 110 and connector body 101 should be less than half the height or depth of resilient block 110.

In one implementation, for use in an automotive air conditioning system, length 300 of resilient block 110 may be 28 mm, width 301 may be 20 mm, depth 400 may be 15 mm, inner bore diameter 211, 212 may be 5 mm, and the center-to-center separation distance 204 between bores 201, 202 may be 9 mm. If recess 203 is provided, recess 203 may have a depth of 2 mm. Optional ridge 205 may be provided to ease mold release during manufacturing.

Thus it is seen that structures for protecting cable connections—and more particularly, for protecting cable connections from impact damage (e.g., from a vehicle collision)—have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. An impact-resistant cable connector, comprising:
- a connector body;
- a resilient block having a first surface facing the connector body and separated from the connector body by a first axial distance, a second surface opposite the first surface, and one or more bores, each of the one or more bores running through both the first surface and the second surface; and
- one or more wires coupled to the connector body, each respective one of the wires passing through a respective one of the bores;
- wherein the resilient block is configured to limit bending of the one or more wires about a first axis parallel to the first surface.

2. The impact-resistant cable connector of claim 1 wherein the resilient block has a first hardness, and the connector body has a second hardness higher than the first hardness.

3. The impact-resistant cable connector of claim 2 wherein the first hardness has a Durometer Shore A value between 55 and 70.

4. The impact-resistant cable connector of claim 1 having two or more bores in the resilient block and two or more wires coupled to the resilient block, the two or more bores being spaced apart by a distance sufficient to prevent at least one of arcing and short-circuiting between the wires when insulation on the wires is damaged.

5. The impact-resistant cable connector of claim 1 wherein the resilient block has a degree of electrical insulation sufficient to prevent at least one of arcing and short-circuiting between the wires when insulation on the wires is damaged.

6. The impact-resistant cable connector of claim 5 wherein the resilient block has a comparative tracking index between 400 and 600.

7. The impact-resistant cable connector of claim 1 wherein each respective one of the bores has an inner diameter that is sized to provide an interference fit with an outer diameter of each respective one of the wires.

8. The impact-resistant cable connector of claim 1 further comprising:
- an abrasion-resistant sleeve surrounding the resilient block and the wires; and
- a fastener that frictionally clamps the abrasion-resistant sleeve to the resilient block.

9. The impact-resistant cable connector of claim 1 wherein:
- the resilient block has a block height measured in a first direction along the first surface perpendicular to the first axis; and
- the first axial distance is less than half the block height.

10. The impact-resistant cable connector of claim 9, wherein:
- the connector body has a connector body height measured in the first direction; and
- the first axial distance is less than half the connector body height.

11. A resilient block for use in an impact-resistant cable assembly, the resilient block having a one or more bores extending therethrough from a first surface to a second surface opposite the first surface, for the passage of one or more wires, wherein:
- the resilient block is configured to limit bending of the one or more wires about a first axis parallel to the first surface, within a first distance from the first surface, wherein the first distance is an axial distance separating the first surface from a connector body; and
- the resilient block has a hardness with a Durometer Shore A value between 55 and 70.

12. The resilient block of claim 11 having two or more bores for the passage of two or more respective wires, the bores being spaced apart by a distance sufficient to prevent at least one of arcing and short-circuiting between the wires when insulation on the wires is damaged.

13. The resilient block of claim 11 having a comparative tracking index between 175 and 600.

14. The resilient block of claim 13 wherein the comparative tracking index is between 400 and 600.

15. The resilient block of claim 11 having a block height measured in a first direction along the first surface perpendicular to the first axis, the first distance being less than half the block height.

16. An impact-resistant cable assembly comprising:

one or more wires;

a resilient block having a number of bores extending therethrough from a first surface to a second surface opposite the first surface, the number of bores corresponding to the number of wires, each respective one of the wires passing through a respective one of the bores, the resilient block being configured to limit bending of the one or more wires about an axis parallel to the first surface, within a first distance from the first surface, wherein the first distance is an axial distance separating the first surface from a connector body;

an abrasion-resistant sleeve surrounding the resilient block and the one or more wires; and a fastener that frictionally clamps the abrasion-resistant sleeve to the resilient block.

17. The impact-resistant cable assembly of claim 16 wherein the resilient block has a hardness with a Durometer Shore A value between 55 and 70.

18. The impact-resistant cable assembly of claim 16 wherein the resilient block has a comparative tracking index between 175 and 600.

19. The impact-resistant cable assembly of claim 18 wherein the resilient block has a comparative tracking index between 400 and 600.

20. The impact-resistant cable assembly of claim 16 wherein the resilient block has a block height measured in a first direction along the first surface perpendicular to the axis, the first distance being less than half the block height.

* * * * *